United States Patent
Ye et al.

(10) Patent No.: US 10,503,981 B2
(45) Date of Patent: Dec. 10, 2019

(54) METHOD AND APPARATUS FOR DETERMINING SIMILARITY OF OBJECTS IN IMAGES

(71) Applicant: CANON KABUSHIKI KAISHA, Tokyo (JP)

(72) Inventors: Getian Ye, Kogarah (AU); Ka Ming Leung, Marsfield (AU)

(73) Assignee: Canon Kabushiki Kaisha, Tokyo (JP)

(*) Notice: Subject to any disclaimer, the term of this patent is extended or adjusted under 35 U.S.C. 154(b) by 170 days.

(21) Appl. No.: 15/634,721

(22) Filed: Jun. 27, 2017

(65) Prior Publication Data
US 2018/0373962 A1 Dec. 27, 2018

(51) Int. Cl.
*G06K 9/00* (2006.01)
*G06K 9/62* (2006.01)

(52) U.S. Cl.
CPC ..... *G06K 9/00771* (2013.01); *G06K 9/00369* (2013.01); *G06K 9/6269* (2013.01)

(58) Field of Classification Search
None
See application file for complete search history.

(56) References Cited

U.S. PATENT DOCUMENTS

| | | | | |
|---|---|---|---|---|
| 6,701,021 B1 * | 3/2004 | Qian | ...................... | G06T 9/008 358/426.04 |
| 9,436,895 B1 * | 9/2016 | Jones | ................... | G06N 3/0454 |
| 9,898,686 B2 * | 2/2018 | Taylor | .................. | G06K 9/6215 |
| 9,911,198 B2 * | 3/2018 | Pham | .................. | G06K 9/00771 |
| 2002/0099675 A1 * | 7/2002 | Agrafiotis | ............ | G06K 9/6251 706/15 |
| 2009/0144033 A1 * | 6/2009 | Liu | ....................... | G06F 16/583 703/2 |

(Continued)

OTHER PUBLICATIONS

Gretton, Arthur, et al. "A Kernel Two-Sample Test", journal. Mar. 2012. pp. 723-773. vol. 13. Publisher Journal of Machine Learning Research (JMLR).

(Continued)

*Primary Examiner* — Vikkram Bali
(74) *Attorney, Agent, or Firm* — Canon U.S.A., Inc. IP Division

(57) ABSTRACT

A method of determining similarity of objects in images. Feature vectors are determined for objects in images captured by cameras operating in a training domain. Feature vectors are determined for the objects in images captured by cameras operating in a target domain, the cameras of the target domain operating with different environmental factors to the cameras of the training domain. A mapping is determined for a difference in the feature vectors of the training domain and the target domain. The difference in the feature vectors of the training domain and the target domain is converted to a matching space by applying the determined mapping to the feature vectors of the training domain and the target domain. A classifier is determined using data associated with the feature vectors of the training domain in the matching space. A similarity of the objects in the images captured in the target domain is determined using a difference of feature vectors for the objects by applying the classifier to the feature vectors of the objects in the matching space.

16 Claims, 8 Drawing Sheets

(56) References Cited

U.S. PATENT DOCUMENTS

2011/0064302 A1* 3/2011 Ma ............... G06K 9/00275
382/159
2012/0027288 A1* 2/2012 Yuan ............... G06K 9/6211
382/152
2016/0155020 A1 6/2016 Tariq

OTHER PUBLICATIONS

Smola, Alex, et al. "A Hilbert Space Embedding for Distributions", journal. 2007. pp. 13-31. Algorithmic Learning Theory: 18th International Conference. Springer.
Pan, Sinno Jialin, et al. "Domain Adaptation via Transfer Component Analysis," journal. Feb. 2011. pp. 199-210. vol. 22, No. 2. Published in IEEE Transactions on Neural Networks.
Zhang, Li, et al. "Learning a discriminative null space for person re-identification," journal. 2016. pp. 1239-1248. Published in Proceedings of the IEEE Conference on Computer Vision and Pattern Recognition.
Ma, Andy J.. Cross-Domain Person Reidentification Using Domain Adaptation Ranking SVMs. Journal. May 2015. pp. 1599-1613. vol. 24. IEEE Transactions on Image Processing, Charlottesville, VA.
Peng, Peixi. Unsupervised Cross-Dataset Transfer Learning for Person Re-identification. Journal. Jun. 2016. pp. 1306-1315. vol. 26. In Proceedings of the IEEE Conference on Computer Vision and Pattern Recognition (CVPR).
Fernado, Basura. Unsupervised Visual Domain Adaptation Using Subspace Alignment. Journal. Dec. 2013. pp. 2960-2967. Proceedings from IEEE International Conference on Computer Vision (ICCV).

* cited by examiner

METHOD AND APPARATUS FOR DETERMINING SIMILARITY OF OBJECTS IN IMAGES

TECHNICAL FIELD

The present invention relates generally to image processing and, in particular, to matching objects between two captured images to determine whether a candidate object is an object of interest. The present invention also relates to a method, apparatus and system for determining similarity of objects in images captured by a plurality of cameras. The present invention also relates to a computer program product including a computer readable medium having recorded thereon a computer program for determining similarity of objects in images captured by a plurality of cameras.

BACKGROUND

Public venues such as shopping centres, parking lots and train stations are increasingly subject to surveillance using large-scale networks of video cameras. Application domains of large-scale video surveillance include security, safety, traffic management and business analytics. In one example application from the security domain, a security officer may want to view any video feed containing a particular suspicious person in order to identify undesirable activities. In another example from the business analytics domain, a shopping centre may wish to track customers across multiple cameras in order to build a profile of shopping habits.

Many surveillance applications require methods, known as "video analytics", to detect, track, match and analyse multiple objects across multiple camera views. In one example, referred to as a "hand-off" application, object matching is used to persistently track multiple objects across first and second cameras with overlapping fields of view. In another example application, referred to as "re-identification", object matching is used to locate a specific object of interest across multiple cameras in the network with non-overlapping fields of view.

Cameras at different locations may have different viewing angles and work under different lighting conditions, such as indoor and outdoor. The different viewing angles and lighting conditions may cause the visual appearance of a person to change significantly between different camera views. In addition, a person may appear in a different orientation in different camera views, such as facing towards or away from the camera, depending on the placement of the camera relative to the flow of pedestrian traffic. Robust person matching in the presence of appearance change due to camera viewing angle, lighting and person orientation is a challenging problem.

The terms "re-identification", "hand-off" and "matching" relate to the task of relating an object of interest within at least partial view of a video camera to another object within at least partial view of the same or another video camera. A person re-identification process is comprised of two major steps: feature extraction and distance calculation. The feature extraction step often forms an appearance descriptor or feature vector to represent the appearance of a person. A descriptor is a derived value or set of derived values determined from the pixel values in an image of a person. One example of a descriptor is a histogram of colour values. Another example of a descriptor is a histogram of quantized image gradient responses. Given a person's image in a camera view, the matching step finds the closest match to the given image from a set of images in another camera view based on the distances from the given image to each image in the image set. The image with the smallest distance to the given image is considered to be the closet match to the given image. A distance metric must be selected to measure the distance between appearance descriptors of two images. Selecting a good distance metric is advantageous for the matching performance of person re-identification. General-purpose distance metrics, e.g., Euclidean distance, cosine distance, and Manhattan distance, often fail to capture the characteristics of appearance descriptors and hence the performance of general purpose distance metrics is usually limited.

To avoid the limitation of the general-purpose distance metrics, a distance metric model may be learned from a training dataset. A distance metric learning method directly learns a distance metric from a given training dataset containing several training samples. Each training sample often contains a pair of appearance descriptors and a classification label indicating if the two appearance descriptors are created from images belonging to the same person or different persons. The classification label is defined as +1 if the appearance descriptors belonging to the same person, while the classification label is defined as −1 if the appearance descriptors belong to different persons. The training samples with positive and negative classification labels are called positive and negative training samples, respectively. The distance metric is explicitly learned to minimize a distance between the appearance descriptors in each positive training sample and maximize the distance between the appearance descriptors in each negative training sample. Discriminative subspace analysis methods learn a projection that maps appearance descriptors to a subspace where appearance descriptors extracted from an image of a person are separated from appearance descriptors extracted from images of other people. During the matching process, the learned projection is used to map appearance descriptors extracted from images of persons to the subspace and calculate the distances between the projected appearance descriptors. One example of discriminative subspace analysis is kernel Fisher discriminant analysis. Another example of discriminative subspace analysis is discriminative null space analysis.

A distance metric ensemble model may also be built by combining the models learned from distance metric learning methods and discriminative subspace analysis methods. A distance metric ensemble method often performs better than each individual metric learning method or discriminative subspace method.

The distance metric model or a distance metric ensemble model learned from a training dataset often perform very poorly on a dataset collected under a new environment, e.g., an airport, which is different from the environment where the training dataset is collected, e.g., a city centre. The differences in lighting conditions, camera view angles, person orientations, and camera sensor characteristics introduce a significant change in the distribution of appearance descriptors. Hence the distributions of appearance descriptors from two different environments are significantly different. This problem is known as the domain shift problem and usually causes a significant degradation in the performance of a person re-identification system when the system is deployed to a new environment. The domain shift problem also exists in the same surveillance system installed at the same location. For example, the training dataset is collected in summer and the system requires to work in winter. The seasonal change introduces a significant change in the distribution of appearance descriptors. The environment where training data is collected is called source domain or training domain and the environment where the system is deployed is called target domain.

One known method to solve the problem of domain shift is to adaptively update a support vector machine (SVM) model learned from source domain data using unlabelled target domain data. The support vector machine (SVM) model is updated based on the assumption that the difference between the mean values of positive and negative samples in the source domain is close to the mean values of positive and negative samples in the target domain. However, this assumption may not be reasonable when there is a large difference between source and target domain, e.g., a large change in lighting conditions or camera view angles.

In another known method for domain adaptation, uses a discriminative component analysis method to jointly learn the similarity measurements for person re-identification in different scenarios in an asymmetrical manner A cross-task data discrepancy constraint is explored to learn a discriminant shared component across tasks. A drawback of the discriminative component analysis method is that a large amount of labelled training data from the target domain is required. Collecting labelled data from the target domain is often time consuming and impractical for large camera networks.

Another known method to solve the problem of domain shift is to capture unlabelled training data in the target domain and use multiple dictionaries to model the similarities and differences between the appearances of people in the source and target domains. In the unlabelled training data capture method, a shared dictionary represents characteristics of appearance that are common to the source and target domain, and an independent residual dictionary for each domain represents the characteristics of appearance unique to each domain. Furthermore, a target dictionary represents characteristics of appearance in the target domain that are not captured by the shared dictionary or residual dictionaries. However, a large amount of training data is required in the target domain to robustly train the residual and target dictionaries in the target domain. Capturing a large training set may not be possible if the target domain is sparsely populated.

SUMMARY

It is an object of the present invention to substantially overcome, or at least ameliorate, one or more disadvantages of existing arrangements.

Disclosed are arrangements relating to comparing objects in images captured from a pair of cameras, based on discriminative subspace analysis using images of objects from a target domain, and images of objects from a source domain.

According to one aspect of the present disclosure, there is provided a method of determining similarity of objects in images, the method comprising:

determining feature vectors for objects in images captured by cameras operating in a training domain;

determining feature vectors for the objects in images captured by cameras operating in a target domain, the cameras of the target domain operating with different environmental factors to the cameras of the training domain;

determining a mapping for a difference in the feature vectors of the training domain and the target domain;

converting the difference in the feature vectors of the training domain and the target domain to a matching space by applying the determined mapping to the feature vectors of the training domain and the target domain;

determining a classifier using data associated with the feature vectors of the training domain in the matching space; and determining a similarity of the objects in the images captured in the target domain using a difference of feature vectors for the objects by applying the classifier to the feature vectors of the objects in the matching space.

According to another aspect of the present disclosure, there is provided an apparatus for determining similarity of objects in images, the apparatus comprising:

determining unit configure to determine feature vectors for objects in images captured by cameras operating in a training domain;

determining unit configure to determine feature vectors for the objects in images captured by cameras operating in a target domain, the cameras of the target domain operating with different environmental factors to the cameras of the training domain;

determining unit configure to determine a mapping for a difference in the feature vectors of the training domain and the target domain;

converting unit configure to convert the difference in the feature vectors of the training domain and the target domain to a matching space by applying the determined mapping to the feature vectors of the training domain and the target domain;

determining unit configure to determine a classifier using data associated with the feature vectors of the training domain in the matching space; and determining unit configure to determine a similarity of the objects in the images captured in the target domain using a difference of feature vectors for the objects by applying the classifier to the feature vectors of the objects in the matching space.

According to still another aspect of the present disclosure, there is provided a non-transitory computer-readable medium storing a program for causing a computer to execute a method for determining similarity of objects in images, the method comprising:

determining feature vectors for objects in images captured by cameras operating in a training domain;

determining feature vectors for the objects in images captured by cameras operating in a target domain, the cameras of the target domain operating with different environmental factors to the cameras of the training domain;

determining a mapping for a difference in the feature vectors of the training domain and the target domain;

converting the difference in the feature vectors of the training domain and the target domain to a matching space by applying the determined mapping to the feature vectors of the training domain and the target domain;

determining a classifier using data associated with the feature vectors of the training domain in the matching space; and determining a similarity of the objects in the images captured in the target domain using a difference of feature vectors for the objects by applying the classifier to the feature vectors of the objects in the matching space.

According to still another aspect of the present disclosure, there is provided a system for determining similarity of objects in images, the system comprising:

a memory for storing data and a computer program;

a processor coupled to the memory for executing the computer program, the program comprising instructions for:

determining feature vectors for objects in images captured by cameras operating in a training domain;

determining feature vectors for the objects in images captured by cameras operating in a target domain, the cameras of the target domain operating with different environmental factors to the cameras of the training domain;

determining a mapping for a difference in the feature vectors of the training domain and the target domain;

converting the difference in the feature vectors of the training domain and the target domain to a matching space by applying the determined mapping to the feature vectors of the training domain and the target domain;

determining a classifier using data associated with the feature vectors of the training domain in the matching space; and determining a similarity of the objects in the images captured in the target domain using a difference of feature vectors for the objects by applying the classifier to the feature vectors of the objects in the matching space.

Other aspects of the invention are also disclosed.

BRIEF DESCRIPTION OF THE DRAWINGS

One or more example embodiments of the invention will now be described with reference to the following drawings, in which.

DETAILED DESCRIPTION

Figure 1:
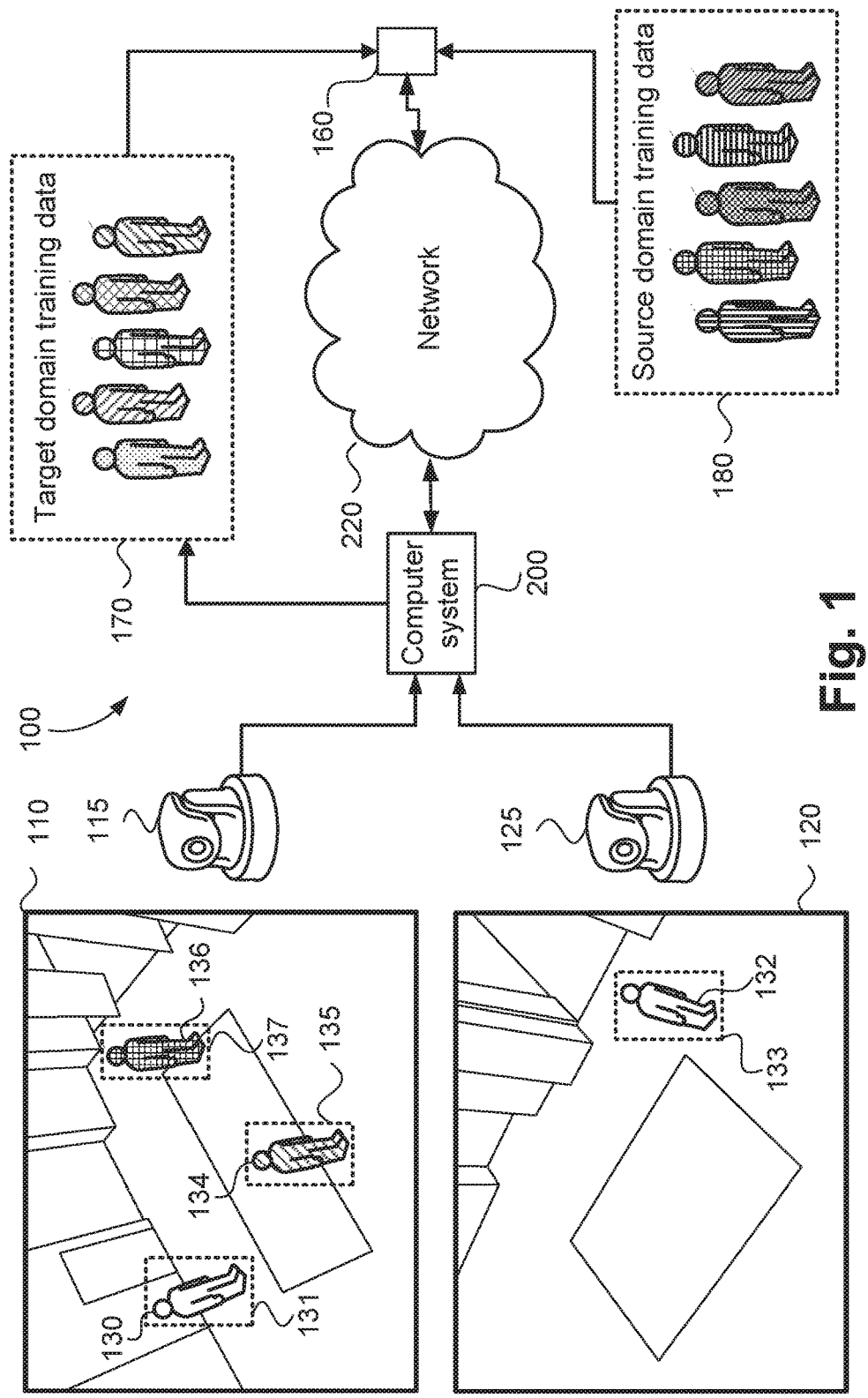
FIG. 1 shows a surveillance system comprising cameras connected to a computer system and a cloud service for analysing objects of interest, to which the arrangements may be applied.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventors or the patent applicant that such documents or devices in any way form part of the common general knowledge in the art.

An image, such as an image 110 in FIG. 1, is made up of visual elements. The image 110 is captured using an image capture device such as a digital camera or video camera. The term "pixel", also referred to as a "pixel location" or "image location", refers in the present disclosure to one of the visual elements in a captured image. Each pixel of an image is described by one or more values characterising a property of a scene captured in the image. In one example, a single intensity value characterises a brightness of the scene at a pixel location. In another example, a triplet of values characterise a colour of the scene at the pixel location.

A "region", also referred to as an "image region", in an image refers to a collection of one or more spatially adjacent visual elements. A "bounding box" refers to a rectilinear image region enclosing an object or part of an object in an image. In one example, the bounding box 131 in FIG. 1 encloses a person 130. A "feature", also referred to as an "appearance descriptor" or "descriptor", represents a derived value or set of derived values determined from the pixel values in an image region. One example is a histogram of colour values in an image region. Another example is a histogram of quantized image gradient responses in a region.

The phrase "foreground mask" refers to a binary image with non-zero values at pixel locations corresponding to an object of interest. In one example, the terms "candidate object" and "object of interest" respectively refer to a person in a crowded airport that has been identified as being of particular interest. A non-zero pixel location in a foreground mask is known as a "foreground pixel". In one arrangement, a foreground mask is determined using a statistical background pixel modelling method such as Mixture of Gaussian (MoG), wherein the background model is maintained over multiple frames with a static camera. In another arrangement, foreground detection is performed on Discrete Cosine Transform blocks. In yet another arrangement, a foreground mask is determined using unsupervised segmentation, for example using superpixels. Any suitable method for determining a foreground mask may equally be practised.

The present description provides a method and system for comparing objects in images captured from a first pair of cameras, based on discriminative subspace analysis using images of objects from a target domain, and images of objects from a source domain. FIG. 1 shows an example surveillance system 100 to which disclosed arrangements may be applied. In one example, the described method may be used to determine whether an object observed in an image 120 of a first scene captured by a first digital camera 125 has the same identity as a second object detected in an image 110 of a second scene captured by a second digital camera 115. In the arrangements described, the terms "object", "person" and "target" relate to an object of interest within at least partial view of one of the cameras 125 and 115. Disclosed arrangements may equally be applied when the images are captured with different environmental factors. For example, the images may be captured by different cameras simultaneously or at different times, or captured by the same camera at different times, including images that represent the same scene or different scenes.

Figure 2A:
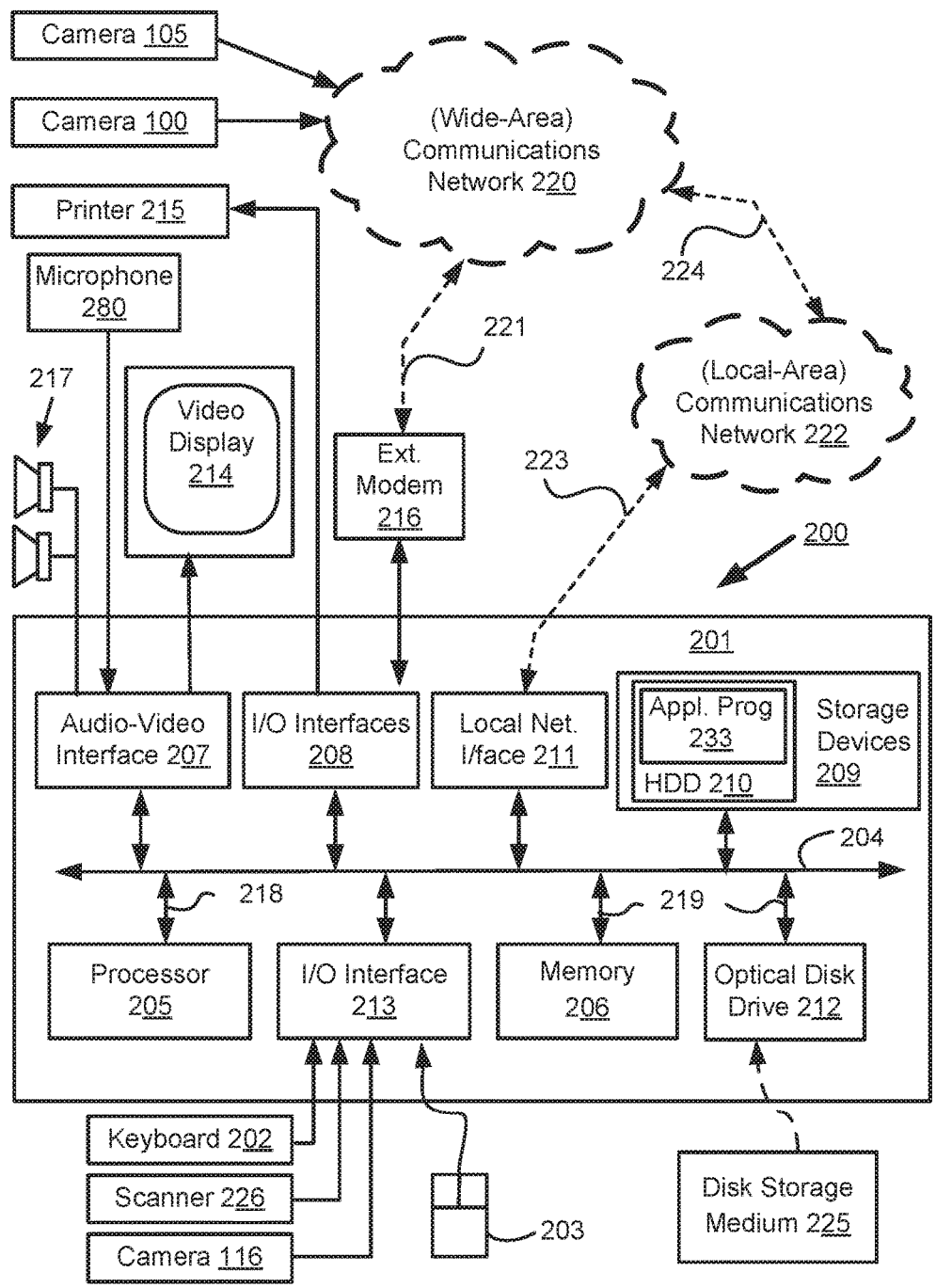
FIGS. 2A and 2B form a schematic block diagram of the computer system upon which the arrangements described can be practiced.
Figure 2B:
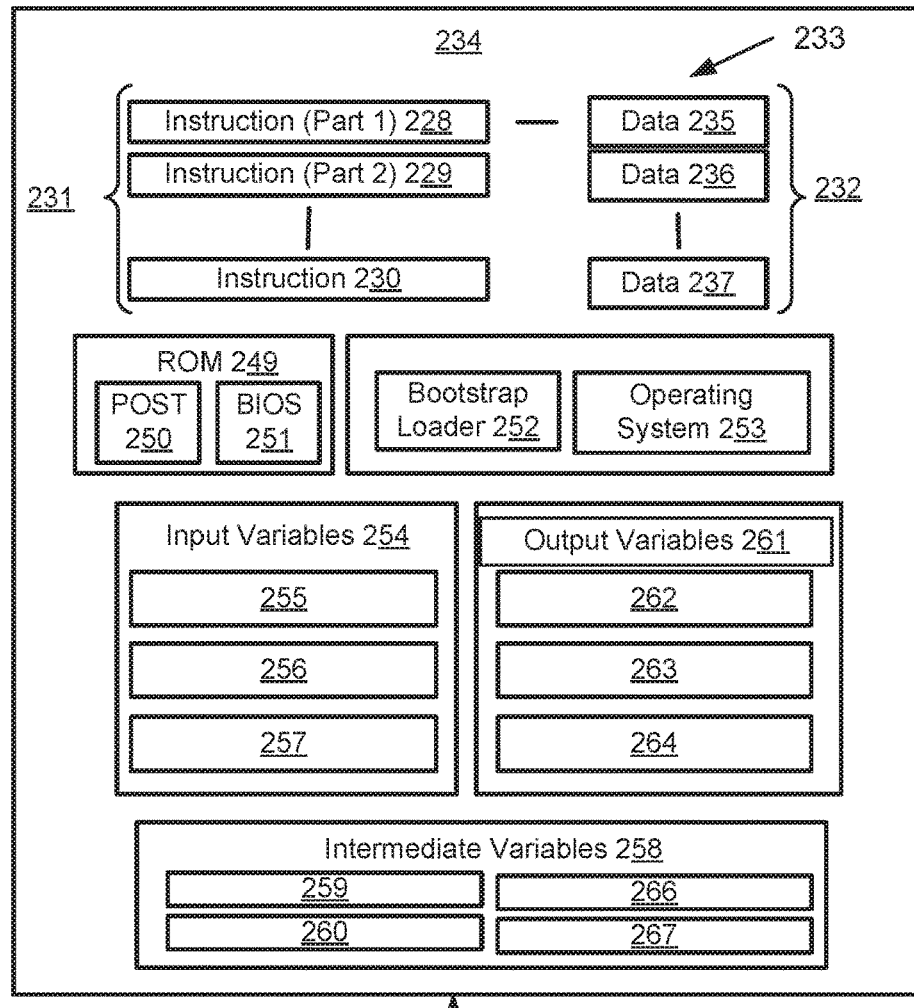

The cameras 115 and 125 may be any type of image capture device suitable for capturing an image of a scene using a sensor such as an optical sensor, an infrared sensor, a radar sensor, and the like or be multi-sensor devices. The images used for matching objects are captured by the same type of sensor. The cameras 115 and 125 may be a digital camera, for example. The cameras 115 and 125 are connected to a computer system 200 as seen in FIGS. 2A and 2B. The computer system 200 is connected to a cloud server 160 via a communications network 220, to which arrangements described may be applied. The cameras 115 and 125 may be in wired or wireless communication with the computer system 200, and the computer system 200 may be in wired or wireless communication with the cloud server 160.

For the example in FIG. 1, a first object is known as a "query" object, and a second object is known as a "gallery" object. A query object may be a person who has been identified as being suspicious at an airport, and a gallery object is a person in a crowded airport, the person being merely a member of the crowd. The gallery object may also be referred to as a "candidate object". In one example, a person 132 in an image 120 is a query object, and three people 130, 134 and 136 in an image 110 are gallery objects. The arrangements described are applied to determine which of the three gallery objects 130, 134 and 136 is a best match for the query object 132.

The example of FIG. 1 may be applied to a range of applications. In one example, the computer system 200 allows a security guard to select a query object through an interactive user interface, and returns images of one or more gallery objects determined to match the query object. In another example, the computer system 200 automatically selects a query object and matches the object across multiple distributed cameras in order to analyse the long-term behaviour of the object. In other arrangements, the computer system 200 is integral to one of the cameras 110 and 120.

While the examples in this disclosure generally relate to surveillance tasks of monitoring persons, the described methods may equally be practised on other types of objects. For example, the described methods may be applied to track a suspicious vehicle. The described methods may also be implemented using different types of sensors including near IR cameras, radar sensors, and laser scanners.

For the example in FIG. 1, the query and gallery objects may be matched by extracting an appearance descriptor for the query object from a bounding box 133, and appearance descriptors for the gallery objects 130, 134 and 136 from the bounding boxes 131, 135 and 137 respectively. A similarity score is determined between the query object and each gallery object based on the appearance descriptors. The gallery object with the greatest similarity to the query object is determined to have the same identity as the query object.

Typically, the training images originate from an existing dataset, known as the source domain training data, collected from cameras other than the query and gallery cameras. For the example shown in FIG. 1, the source domain training data 180 pre-exists on the cloud server 160.

Typically, a standard machine learning algorithm may perform very poorly if the algorithm is trained using only source domain data 180 if the camera viewing angle, lighting conditions, person orientation and clothing that characterize the images captured by cameras 115 and 125 differ significantly from the source domain data. The present description provides a method to improve the performance of the machine learning algorithm using additional target domain training data. For the example in FIG. 1, the target domain training data 170 is collected from the cameras 115 and 125 during a training phase of operation, and communicated from the computer system 200 to the cloud service 160. A similarity model is learned on the cloud server 160 based on the target domain training data 170 and pre-exiting source domain training data 180, and transmitted back to the computer system 200.

FIGS. 2A and 2B depict the computer system 200, upon which the arrangements described can be practiced.

As seen in FIG. 2A, the computer system 200 includes: a computer module 201; input devices such as a keyboard 202, a mouse pointer device 203, a scanner 226, one or more cameras such as a cameras 116, and a microphone 280; and output devices including a printer 215, a display device 214 and loudspeakers 217. An external Modulator-Demodulator (Modem) transceiver device 216 may be used by the computer module 201 for communicating to and from remote cameras such as the cameras 100 and 105 over the communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The remote cameras 100 and 105 form part of the camera network 101. In the arrangements described, the cameras 100 and 105 relate to video cameras. The camera network 101 can comprise any type of image capture devices capable of capturing image and/or video data from which vanishing points can be determined. The camera network 101 comprises a plurality of a single type of image capture device. In other arrangements, image capture devices integral or proximate to the computer module 201, such as the camera 116, can form part of the camera network 101.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 116 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or a like computer systems.

The methods described may be implemented using the computer system 200 wherein the processes of FIGS. 4, 5, 6, and 9, to be described, may be implemented as one or more software application programs 233 executable within the computer system 200. In particular, the steps of the methods described are effected by instructions 231 (in FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the methods described and a second part and the corresponding code modules manage a user interface between the first part and the user.

The software 233 may be stored in a computer readable medium, including the storage devices described below, for example. The software 233 is typically stored in the HDD 210 or the memory 206. The software is loaded into the computer system 200 from the computer readable medium, and then executed by the computer system 200. Thus, for example, the software 233 may be stored on an optically readable disk storage medium (e.g., CD-ROM) 225 that is read by the optical disk drive 212. A computer readable medium having such software or computer program recorded on the computer readable medium is a computer program product. The use of the computer program product in the computer system 200 preferably effects an advantageous apparatus for implementing the methods described.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using the connection 218. The memory 234 is coupled to the bus 204 using the connection 219.

The application program 233 includes the sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The arrangements described use input variables 254, which are stored in the memory 234 in corresponding memory locations 255, 256, 257. The arrangements described produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;
 a decode operation in which the control unit 239 determines which instruction has been fetched; and
 an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 4, 5, 6 and 9 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The methods described may alternatively be implemented in dedicated hardware such as one or more integrated circuits performing the functions or sub functions. Such dedicated hardware may include graphic processors, digital signal processors, or one or more microprocessors and associated memories, and may reside on platforms such as video cameras.

Figure 3:
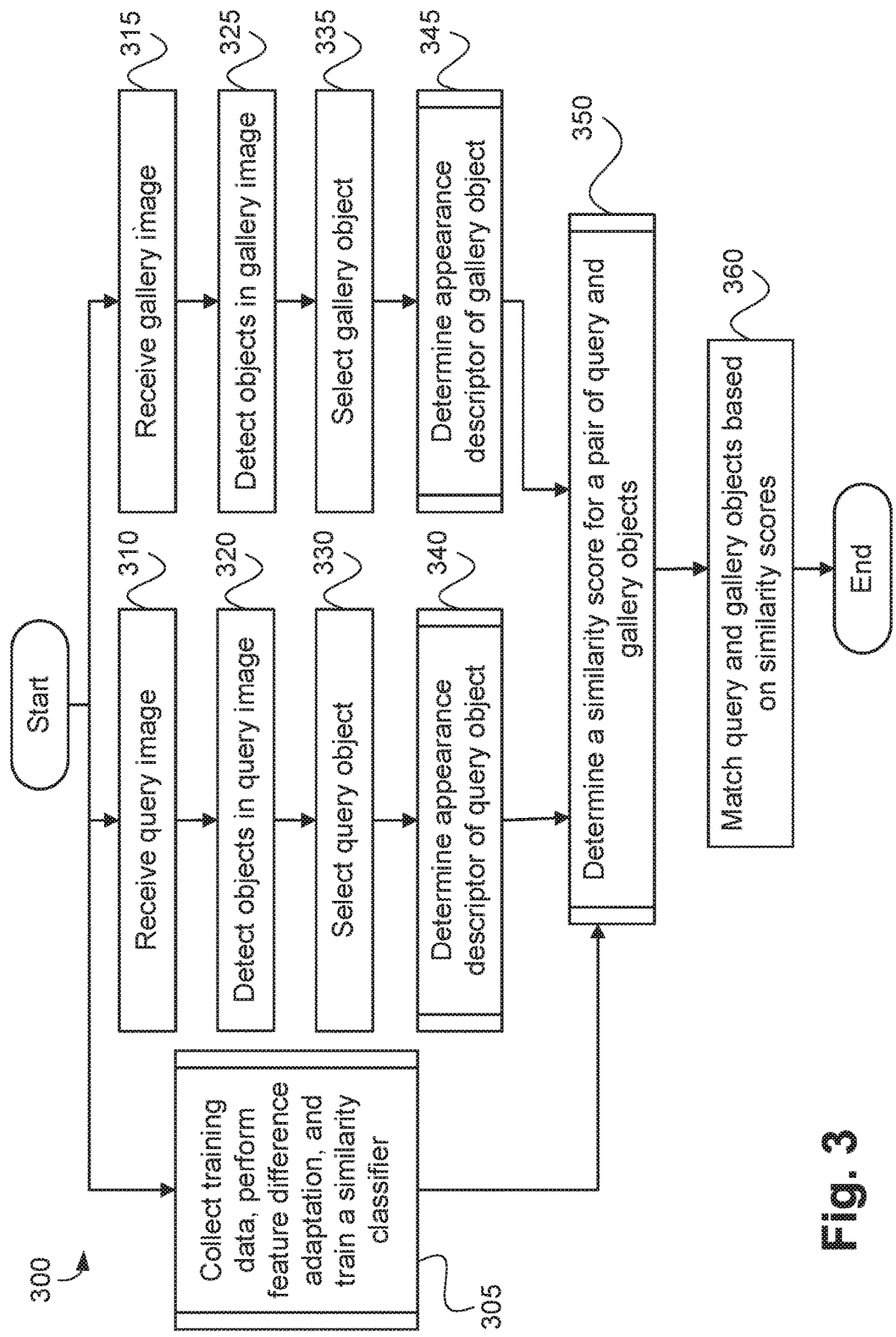
FIG. 3 is a schematic flow diagram of a method of matching objects between a query image and a gallery image using feature difference adaptation and a similarity classifier.

FIG. 3 shows a method 300 of matching objects between images based on similarity scores determined by adapting feature differences of the objects in a latent subspace.

In one example, the matching method 300 is used to determine the identity of an object in an image. The method 300 is typically implemented by one or more software code modules of the application 233, stored in the hard disk drive 210 and being controlled in execution by the processor 205. In some arrangements, portions of the method 300 are executed on a processor of a cloud server computer, such as the cloud server 160.

The method 300 is described by way of example with reference to the query image 120 containing the object of interest 132 detected at the bounding box 133, and the gallery image 110 containing candidate objects 130, 134 and 136, detected at the bounding boxes 131, 135 and 137 respectively. In the example described, the method 300 is used to determine which of the detections 131, 135 and 137 is the object of interest 132, detected at 133. The following description provides details, examples and alternative implementations for the main steps of the method 300. Further details, examples and alternative implementations of steps 305, 340, and 350 are described hereafter.

The method 300 starts at a data collection and training step 305. At step 305, training data from source and target domains are collected under execution of the processor 205. Also at step 305, a similarity classifier for matching objects using the collected training data is trained. In some arrangements, the target domain images are processed on the computer system 200 to extract appearance descriptors, which are then transmitted to a cloud server 160 to determine a common latent subspace and to train a similarity classifier. In other arrangements, the target domain images are transmitted to the cloud server 160 for processing. In yet other arrangements, image processing and feature difference adaptation are processed locally on the computer system 200. A method 400 of performing feature difference adaptation for query and gallery objects, as applied to the feature difference adaptation step 305 of method 300, are described hereafter with reference to FIG. 4. The outputs of step 305 are a projection W and a similarity classifier for determining a similarity score of a pair of query and gallery objects.

The method 300 also starts at a receiving step 310. At execution of the step 310, at least one image containing a query object is received as input. For example, the image 120 is a query image received from a query camera 125 containing a query object 132. The image 120 may be stored in the memory 206. The method 300 progresses under execution of the processor 205 from the receiving step 310 to a detecting step 320. The detecting step 320 executes to detect a query object from the received query images. One example of detecting the query object uses a pedestrian detection method to detect all persons in the query images. A commonly-used pedestrian detection method learns a detector to search for persons within an image by scanning pixel locations. The detector produces a high score if the local image features inside the local search window meet certain criteria. The local image feature may be the histogram of oriented gradients or local binary pattern. Other pedestrian detection methods include a part-based detection method and a background subtraction method. The output of the pedestrian detection method is a set of bounding boxes. The image region defined by each bounding box contains a person.

The method 300 progresses under execution of the processor 205 from the detecting step 320 to a selecting step 330. In one arrangement, a user such as a security guard manually selects an automatically detected bounding box, such as the bounding box 133, as the query object via a graphical user interface executing on the module 201. In another arrangement, the user manually draws a bounding box containing an object to define the query object via a graphical user interface executing on the module 201. In yet another arrangement, an algorithm executing on the module 201 automatically selects an automatically detected bounding box, such as the bounding box 133, as the query object based on pre-defined rules. The output of step 330 is an image region within a bounding box for the query object.

The method 300 progresses under execution of the processor 205 from the step 330 to a determining step 340. An appearance descriptor for the query object is determined at step 340 based on pixels in the image region determined at step 330. A method 500 of determining an appearance descriptor of an object, as executed at step 340, will be described hereafter with reference to FIG. 5. The output of step 340 is an appearance descriptor characterizing the query object.

As seen in FIG. 3, the method 300 also starts at a receiving step 315. In one arrangement, steps 305, 310 and 315 start concurrently. In another arrangement, steps 305, 310 and 315 are executed at different times. In all arrangements, step 305 is executed before step 350. In some arrangements, step 305 is executed during an initial installation or "training" phase, while the remaining steps in method 300 are executed during routine operation after the "training" phase has finished. Furthermore, steps 350 and 355 are executed before step 360 in all arrangements.

At execution of step 315, at least one image containing gallery objects is received as input. For example, the image 110 is a gallery image received from a gallery camera 115 containing gallery objects 130, 134 and 136. The method 300 progresses under execution of the processor 205 from step 315 to a detecting step 325. At step 325, a set of gallery objects is detected in the received gallery images. In one arrangement, step 325 is implemented for gallery objects in a similar manner to step 320 for query objects. The output of step 325 is a set of bounding boxes, such as the bounding boxes 131, 135 and 137 corresponding to the gallery objects 130, 134 and 136.

The method 300 progresses under execution of the processor 205 from step 325 to a selecting step 335. At the selecting step 335, a gallery object is selected for comparing with the query object determined at step 330. In one arrangement, the gallery objects determined at detecting step 325 are stored in a list, for example in the memory 206, and a gallery object is selected by enumerating the objects in the list. In other arrangements, step 335 is implemented for gallery objects in a similar manner to step 330 for query objects. The output of the selecting step 335 is an image region within a bounding box for the gallery object. The image region output at step 335 may be stored in the memory 206.

The method 300 progresses under execution of the processor 205 from the step 335 to a determining step 345. An appearance descriptor for the gallery object is determined at step 345 based on pixels in the image region determined at step 335. Further details, examples and alternative implementations of the step 345 are described hereafter with reference to FIG. 5. The output of step 345 is an appearance descriptor characterizing the gallery object. Again, the appearance descriptor output at step 345 may be stored in the memory 206.

After execution of steps 305, 340 and 345, the method 300 progresses under execution of the processor 205 to a computing step 350. At determining step 350, a similarity score is determined for the pair of selected query and gallery objects selected at steps 330 and 335 respectively to determine whether the objects have the same identity. A method 700 of determining similarity scores for a pair of query and gallery objects, as executed at step 350, will be described hereafter with reference to FIG. 7. The output of step 350 is a set of similarity scores indicating the similarity between every pair of query and gallery objects.

The method 300 progresses under execution of the processor 205 from the step 350 to a matching step 360. At matching step 360, the similarity scores determined at step 350 are used to determine whether a pair of query and gallery objects have the same identity. The determination is made at step 360 based on similarity scores determined at step [3]50. In one arrangement, the determination of whether the two objects match (i.e., have the same identity) is made at step 360 by comparing a similarity score to a fixed threshold. If the similarity score exceeds the threshold, then the query and gallery objects are determined to have the same identity.

In other arrangements, the determination of whether a gallery object has the same identity as the query object is made at step 360 by comparing the similarity score determined at step 350 to the similarity scores between the query object and all other gallery objects in the video stream. If the similarity score for a gallery object is higher than those of all other gallery objects, then the query and gallery objects are determined to have the same identity.

The computer system 200 generates a response if a pair of query and gallery objects are determined to have the same identity. In one example, the match is communicated to a user through a graphical user interface. In another example, the response is to tag the gallery object for further automatic analysis, such as tracking the gallery object through the field of view of the gallery camera.

The method 300 concludes after completing the matching step 360.

Figure 4:
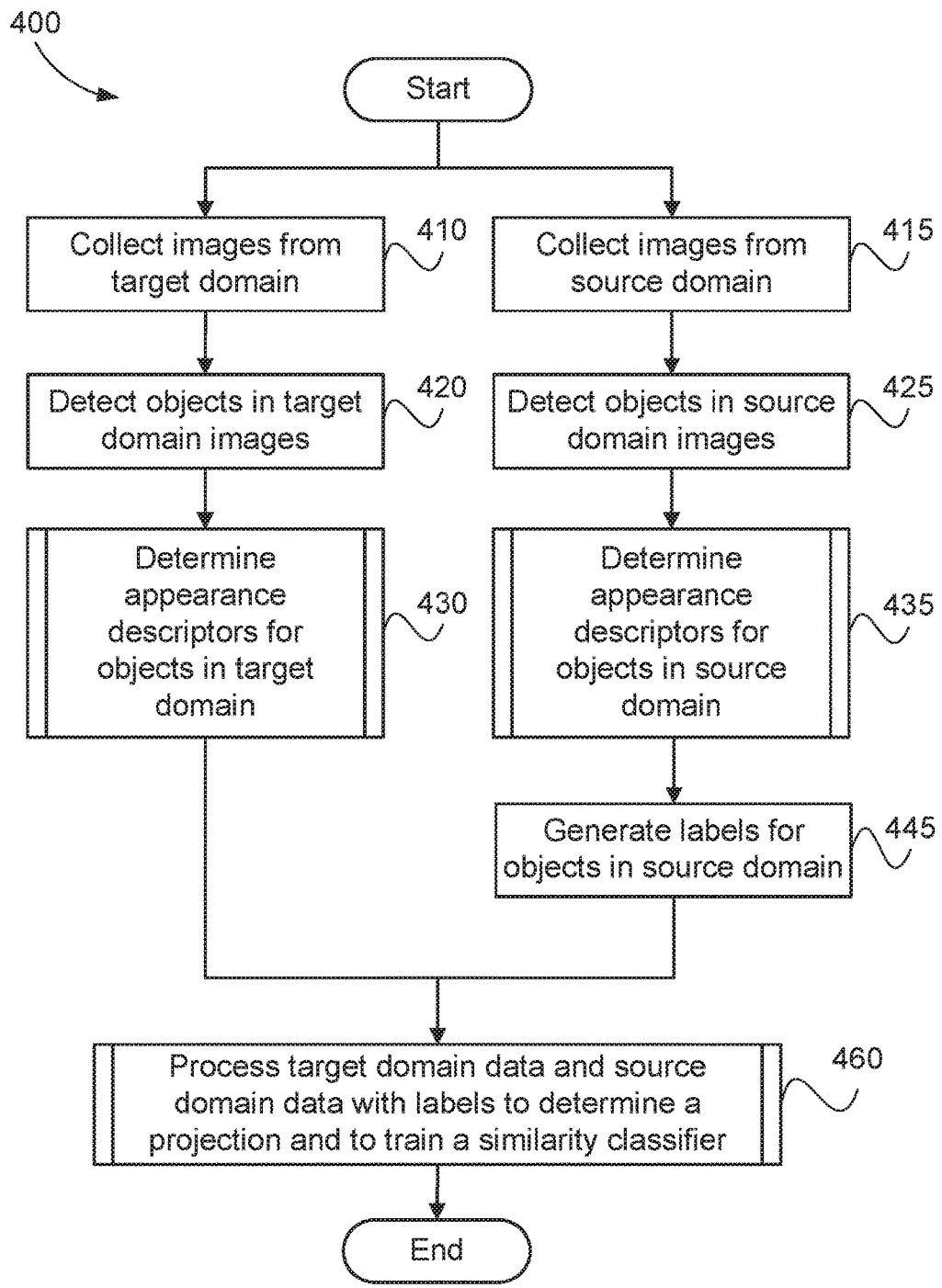
FIG. 4 is a schematic flow diagram of a method of performing feature difference adaptation, as used in the method of FIG. 3.

A method 400 of performing feature difference adaptation for query and gallery objects, as applied to the feature difference adaptation step 305 of method 300, are described hereafter with reference to FIG. 4.

The method 400 of collecting training data, performing feature difference adaptation, and training a similarity classifier, as executed at step 305 of the method 300, will now be described with reference to FIG. 4. The method 400 is typically implemented at least in part as one or more software code modules of the software application program 233 resident in the hard disk drive 210 and being controlled in execution by the processor 205. The method 400 may in some arrangements be executed at least in part on a processor of the cloud server 160.

The method 400 starts at a collecting step 410. In execution of the step 410, images containing a plurality of objects are collected from the target domain. One example of a target domain is a set of cameras installed at a customer site. For the example application in FIG. 1, cameras 115 and 125 are examples of cameras installed at a customer site, and images 110 and 120 are examples of gallery and query images respectively containing a plurality of objects in the target domain.

The method 400 passes under execution of the processor 205 from step 410 to a detecting step 420. At step 420, a set of objects is detected in the target domain images collected at step 410. In one arrangement, at step 420, objects in the target domain images are detected in a similar manner to step 320 for query objects. The output of step 420 is a set of bounding boxes, such as the bounding boxes 131, 133, 135 and 137 corresponding to the objects 130, 132, 134 and 136 in the target domain images 110 and 120. The determined bounding boxes 131, 133, 135 and 137 may be stored in the memory 206.

The method 400 progresses under execution of the processor 205 from the step 420 to a determining step 430. An appearance descriptor for each detected object in the target domain is determined at step 430 based on pixels in the bounding boxes determined at step 420. The appearance descriptor is determined in accordance with the method 500 which will be described hereafter with reference to FIG. 5. The output of step 430 is a set of appearance descriptors describing the detected objects in the target domain images. The set of appearance descriptors determined at step 430 is also known as the "target domain training data".

As seen in FIG. 4, the method 400 also starts at a collecting step 415. In one arrangement, steps 410 and 415 are executed concurrently. In another arrangement, steps 410 and 415 are executed at different times. In one arrangement, steps 415, 425 and 435 are executed in the factory before the system 100 is installed at a customer site, and steps 410, 420 and 430 are executed after installing the system but before regular operation, during an initial "training" phase. Steps 430 and 435 are executed before step 460 in all arrangements.

In execution of step 415, query and gallery images containing a plurality of objects are collected from the source domain. In one arrangement, source domain images are collected from publicly available datasets, such as the VIPeR dataset. In another arrangement, source domain images are collected from at least two cameras other than the cameras in the target domain. In one example, source domain images are collected from cameras owned by the camera manufacturer.

The method 400 passes under execution of the processor 205 from step 415 to a detecting step 425. At step 425, a set of objects is detected in the source domain images collected at step 415. In one arrangement, step 425 detects objects in the source domain images in a similar manner to step 420 for target domain images. The output of step 425 is a set of bounding boxes which may be stored in the memory 206.

The method 400 progresses under execution of the processor 205 from the step 425 to a determining step 435. An appearance descriptor for each detected object in the source domain is determined at step 435 based on pixels in the bounding boxes determined at step 425. The appearance descriptor is determined at step 435 using the method 500 which is are described hereafter with reference to FIG. 5. The output of step 435 is a set of appearance descriptors describing the detected objects in the source domain images. The set of appearance descriptors determined at step 435 is also known as the "source domain training data" which may be stored in the memory 206.

The method 400 progresses under execution of the processor 205 from the step 435 to a label generating step 445. Each detected object in the source domain is given a label representing the identity of the object at step 445. Since a person may appear in multiple source domain images, all the detected objects associated to the person have the same label. In one arrangement, labels for detected objects from the source domain may be generated manually by a human operator. In another arrangement, an algorithm executing on the module 201 may automatically generate labels for detected objects based on prior knowledge of the scene and camera configurations, object tracking information, or additional hardware such as RFID and fiducial markers. The outputs of step 445 is a set of labels for each detected objects from the source domain.

After execution of steps 430 and 445, the method 400 progresses under execution of the processor 205 to a processing step 460. At processing step 460, the target domain training data and labelled source domain training data are used to determine a projection W and to train a similarity classifier for determining the similarity between a pair of objects. A method 600 of processing data to determine projection W that maps the source and target domain data to a latent subspace and to train a similarity classifier for determining similarity between a pair of objects, as executed at step 460, is described hereafter with reference to FIG. 6.

The projection W and the similarity classifier may be learned on a customer server such as the computer system 200 in FIG. 1 or, in some arrangements, at a cloud server such as the cloud server 160. Furthermore, steps 415, 425 and 435 for determining the source domain training data may also be executed on a cloud server. If the projection W and the similarity classifier are learned on a cloud server, the target domain training data determined at step 430 is transmitted via the communications network 220 from a customer server to the cloud server 160 prior to the execution of step 460. After execution of step 460, the learned projection W, the similarity classifier, and model parameters are transmitted via the communications network 220 from the cloud server 160 back to the customer server.

Figure 5:
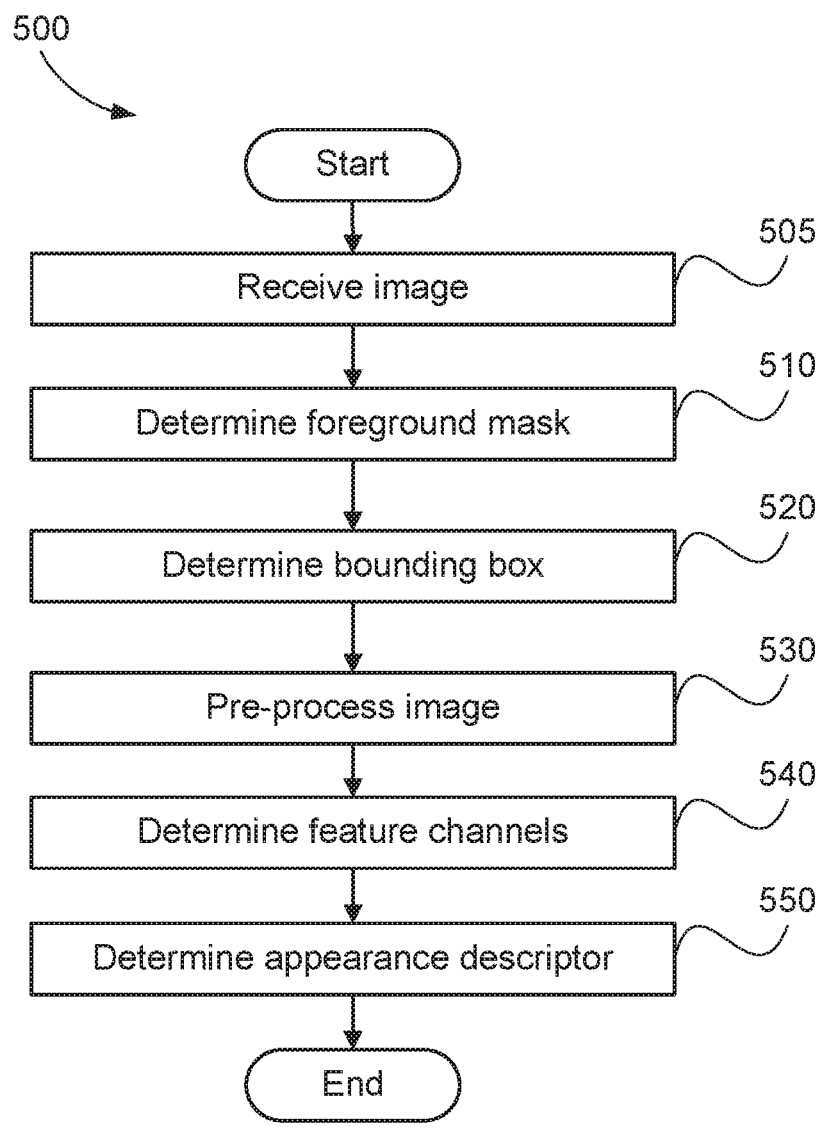
FIG. 5 is a schematic flow diagram of a method of determining an appearance descriptor of an object as used in the methods of FIG. 3 and FIG. 4.

A method 500 of determining an appearance descriptor of an object, as executed at the steps 340 and 345 of the method 300 and steps 430 and 435 of the method 400 is now described with reference to FIG. 5. The method 500 may be implemented within the module 201 as one or more software code modules of the software application program 233 resident in the hard disk drive 210 and being controlled by execution of the processor 205.

The method 500 starts at a receiving step 505, in which an image or image sequence containing an object and a corresponding bounding box, such as the bounding box selected at step 330 or 335, are received as input. The image or image sequence may be stored in the memory 206. In one arrangement, the bounding box contains the whole body of a person. In one example, when the method 500 is applied to the query object 132 shown in FIG. 1, step 505 receives the image 120 and the bounding box 133 as input. In another example, the bounding boxes containing head regions of persons are received.

The method 500 passes under execution of the processor 205 from the step 505 to a determining step 510. At step 510, a foreground confidence mask is determined under execution of the processor 205 and may be stored in the memory 206. The foreground confidence mask assigns to each pixel in the bounding box received at step 505 a value indicating a confidence that the pixel belongs to an object. In one arrangement, a foreground confidence mask is determined at step 505 by performing foreground separation using a statistical background pixel modelling method such as Mixture of Gaussian (MoG), wherein the background model is maintained over multiple frames with a static camera.

The method 500 passes under execution of the processor 205 from step 510 to a refining step 520. At step 520, the bounding box received at step 505 is refined to tightly bound the body of the person, based on the foreground confidence mask determined at step 510. In one arrangement, the bounding box for the head region received at step 505 is converted to a full body bounding box by only including the pixels with a foreground confidence value determined at step 510 higher than a per-defined threshold and within a reasonable distance from the head region. In another arrangement, the bounding box for the whole body received at step 505 is refined (by shrinking or extending) to include the pixels with a foreground confidence value determined at the step 510 higher than a per-defined threshold and within a reasonable distance from the body region.

The method 500 passes under execution of the processor 205 from step 520 to a pre-processing step 530. In execution of the pre-processing step 530, the image region inside the bounding box determined at step 520 is pre-processed for feature determination. In one arrangement, a weighting scheme is used to weight every pixel of the image region inside the bounding box determined at step 520. One example of the weighting scheme uses a 2-D Gaussian function to weight the pixels based on the spatial locations. The pixels located close to the centre of the bounding box is assigned by higher weight than the pixels located further from the centre of the bounding box. Another example of the weighting scheme uses the foreground confidence mask determining step 510 to weight the pixels based on the distances from the pixel locations to the geometric mean of the foreground confidence mask. In another arrangement, the observed object in the bounding box determined at step 520 is rectified to a vertical orientation, which reduces a variation in the visual appearance of an object due to the viewpoint of the camera. In yet another arrangement, colour normalization is applied to the image inside the bounding box determined at step 520 to compensate lighting changes across cameras (e.g., cameras 115, 125).

The method 500 passes under execution of the processor 205 from step 530 to a determining step 540. Execution of the step 500 determines feature channels for the pre-processed image generated in the step 530. At each feature channel, each pixel in the image is assigned a feature value. In one arrangement, a feature channel is the red channel of the image. In another arrangement, a feature channel is the green channel of the image. In yet another arrangement, a feature channel is the blue channel of the image. In still another arrangement, a feature channel is local binary patterns (LBP) of the image. In yet another arrangement, a feature channel is the image gradient of the image.

The method 500 passes under execution of the processor 205 from step 540 to a determining step 550. At step 550, the appearance descriptor is determined from the feature channels determined at the step 540. The appearance descriptor, also referred to as a feature vector, is determined based on pixel properties of pixels in a region of an image. The determined appearance descriptor may be stored in the memory 206 under execution of the processor 205.

In one arrangement, the appearance descriptor is determined at step 540 by concatenating pixel properties such as colour, texture and shape feature components, encoding a spatial distribution of colour and texture by dividing an image into regions. The colour feature component consists of colour histograms determined independently over numerous horizontal stripes (e.g., 15), from the colour feature channels determined at step 540. Histograms are normalized to a sum of unity for each stripe. The shape feature component is a histogram of oriented gradients (HOG) descriptor calculated based on the image gradient feature channel determined at step 540. The texture feature component consists of LBP histograms determined independently for cells with pre-defined size, based on the LBP feature channel determined at step 540. The appearance descriptor is formed by concatenating the square root of the above components to form a single vector. In another arrangement, the appearance descriptor is determined at step 540 by encoding appearance as the difference between histograms across pairs of local regions.

The method 500 concludes after completing the determining step 550. An appearance descriptor is typically in the form of a vector and may also be referred to a plurality of feature vectors. The steps 510 to 550 effectively operate to determine feature vectors based on pixel properties of pixels in the received image or sequence of images.

The method 600 of processing data to determine projection W that maps the source and target domain data to a latent subspace and to train a similarity classifier for determining similarity between a pair of objects, as executed at step 460 of the method 400, is now described with reference to FIG. 6. As described above, an appearance descriptor is typically in the form of a vector and may also be referred to a plurality of feature vectors The method 600 is typically implemented at least in part as one or more software code modules of the software application program 233 resident in the hard disk drive 210 and being controlled in execution by the processor 205 both within the computer system 150. The method 400 may in some arrangements be executed at least in part on a processor of the cloud server 160.

The method 600 starts at a receiving step 610, where the labelled source domain training data is received from query camera and gallery camera. The labelled source domain training data contains appearance descriptors for all detected objects in the query image and gallery image from source domain. Each appearance descriptor is associated with a label, generated at step 445 of the method 400, representing the identity of the detected object.

The method 600 progresses under execution of the processor 205 from step 610 to a determining step 620. At step 620, feature differences between the appearance descriptors of every pair of query and gallery objects from the source domain are determined. In one arrangement, at step 620, an absolute difference between the appearance descriptor of the query object and appearance descriptor of the gallery object is determined. In an alternative arrangement, the feature difference is determined by determining a function of the distance between appearance descriptors. For example, the function is a polynomial function or an exponential function. The distance between appearance descriptors may be a Euclidean distance or cosine distance. The output of step 620 is a set of feature differences for all pairs of query and gallery objects in source domain.

The method 600 progresses, under the execution of the processor 205 from step 620 to a label generating step 630. At step 630, a binary label $y_i$ is determined for each feature difference $x_{S,i}$ determined at step 620. The binary label $y_i$ indicates whether the objects detected from the query and the gallery images have the same identity. If two objects have the same identity, the label $y_i$ is equal to one (1). Otherwise, the label $y_i$ is equal to negative one (−1). The output of steps 630 is a set of binary labels associated to the feature differences determined at step 620. The binary labels may be stored in the memory 206.

Figure 6:
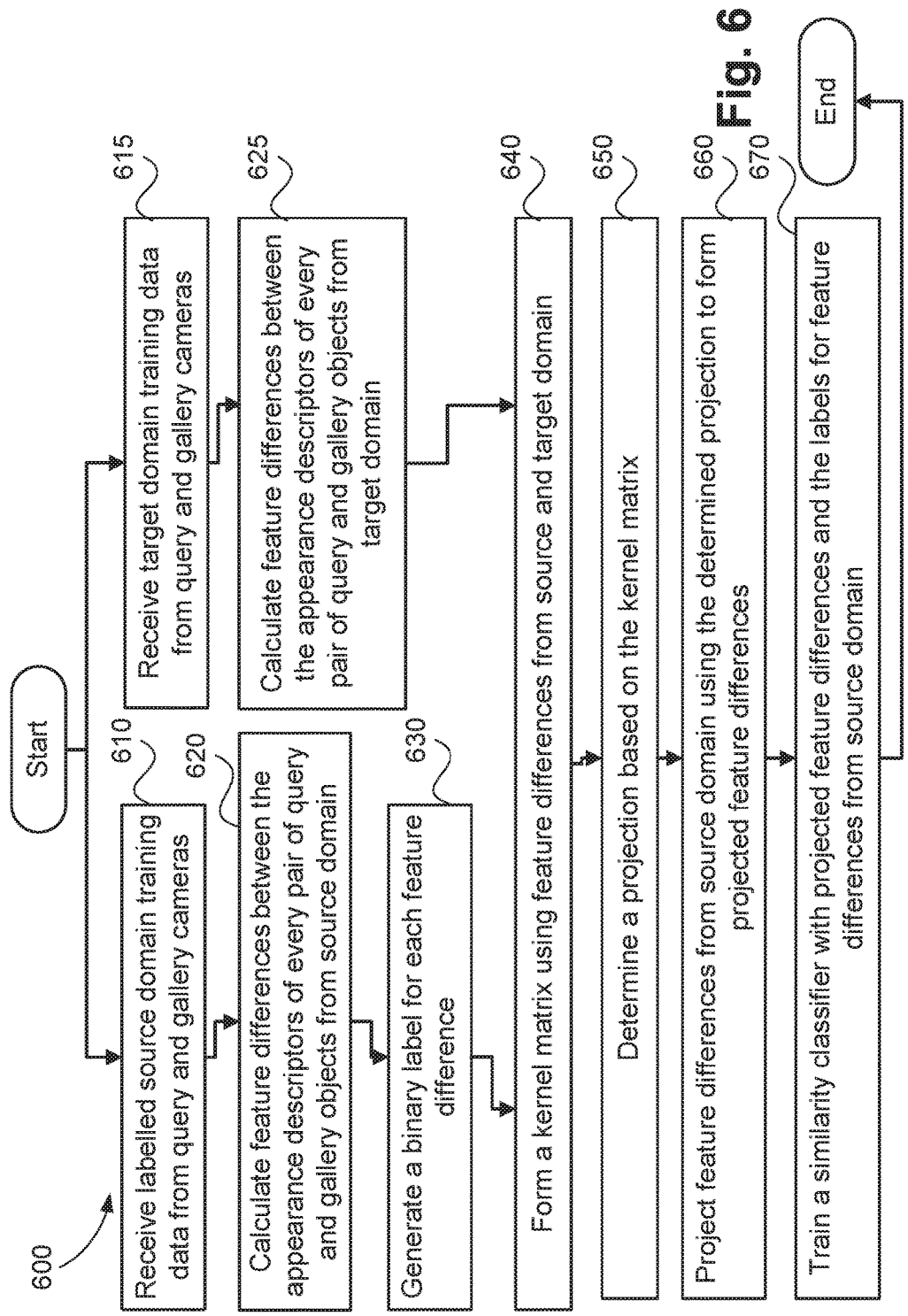
FIG. 6 is a schematic flow diagram of a method of determining a projection that maps source and target domain data to a latent subspace, and training a similarity classifier for determining similarity between a pair of objects as used in the method of FIG. 4.

At seen in FIG. 6, the method 600 also starts at a receiving step 615. In one arrangement, steps 610 and 620 start concurrently. In another arrangement, steps 610 and 615 are executed at different times. In all arrangements, steps 630 and 625 are executed before steps 640.

At execution of step 615, the received target domain training data contains appearance descriptors for all detected objects in the query (e.g., image 120) and gallery images (e.g., image 110) from target domain. The target domain training data does not have any labels.

The method 600 progresses under execution of the processor 205 from the step 615 to a calculating step 625. At step 625, feature differences between the appearance descriptors of every pair of query and gallery objects from the target domain are determined. Step 625 is implemented in a similar manner to step 620.

The method 600 progresses under the execution of the processor 205 from the steps 630 and 625 to a determining step 640, to determine a kernel matrix using the feature differences from source and target domain determined at step 620 and step 625, respectively. Let $X_S = \{x_{S,i}\}_{i=1}^{N_S}$ and $X_T = \{x_{T,i}\}_{i=1}^{N_T}$ be $N_S$ feature differences from the source domain and $N_T$ feature differences from the target domain, respectively. A composite kernel matrix K is formed in accordance with Equation (1), as follows:

$$K = \begin{bmatrix} K_{S,S} & K_{S,T} \\ K_{T,S} & K_{T,T} \end{bmatrix} \in \mathbb{R}^{(N_S+N_T) \times (N_S+N_T)} \quad (1)$$

where $K_{S,S}$ and $K_{T,T}$ represent the intra-domain kernel matrices determined using feature differences from the source and target domain, respectively. Each element or kernel value of an intra-domain kernel matrix is determined by taking a kernel function of two feature differences from the same domain, e.g., $K_{i,j} = k(x_i, x_j)$ where $x_i$ and $x_j$ are two feature differences from the same domain and $k(\cdot)$ is a pre-defined kernel function, e.g., a Gaussian kernel function or an intersection kernel function. In one example, the intra-domain kernel matrix $K_{S,S}$ is constructed using the feature differences with binary labels 1 and −1 from source domain. In another example, the intra-domain kernel matrix $K_{S,S}$ is constructed using the feature differences with label one (1) from source domain. In the composite kernel matrix K, $K_{S,T}$ and $K_{T,S}$ represent the inter-domain matrices and $K_{S,T}$ is equal to the transpose of $K_{T,S}$. Each element of an inter-domain kernel matrix is determined by taking a kernel function of two feature differences from two different domains, e.g., $K_{i,j} = k(x_i, x_j)$ where $x_i$ is a feature difference from one domain and $x_j$ is a feature difference from the other domain. The kernel function $k(\cdot)$ used in the inter-domain kernel matrices is the same as the kernel function used in the intra-domain kernel matrices. The parameters of the kernel function may be predefined or determined using the kernel values in the kernel matrix. For example, if the kernel function is selected as a Gaussian kernel function, the bandwidth of the Gaussian kernel function is predefined to be one (1.0) or is assigned by taking the average of all the kernel values in the kernel matrix. The size of the composite kernel matrix K is $(N_S+N_T)$ by $(N_S+N_T)$.

The method 600 progresses under execution of the processor 205 from step 640 to a determining step 650, where a projection W is determined using the composite kernel matrix K formed at step 640. The projection W is used for converting appearance descriptors of the source and target domains to a matching space by applying the projection W to the appearance descriptors of the source and the target domain. As described below, the projection W is learned for mapping feature differences from source and target domain to a matching (or common) latent subspace where the distance between the distributions of feature differences from source and target domain is minimised.

In one arrangement, the projection W is learned without using any labels from the source domain. In the arrangement where the projection W is learned without using any labels from the source domain, the distribution of feature differences is represented by the mean value of all the feature differences from the same domain. The distance between the distributions of feature differences from two different domains is the distance between two mean values. The distance may be Euclidean distance or cosine distance. The projection W is determined by maximising the following objective function formed based on the distance between the mean values, in accordance with Equation (2) as follows:

$$\max_W \mathrm{trace}((W^T(KLK+\mu I)W)^{-1} W^T KHKW) \quad (2)$$

where trace(·) denotes the trace of a matrix, $\mu$ is a regularisation factor, L is a frequency matrix, and H is a centering matrix. The regularisation factor $\mu$ may be pre-selected, e.g., $\mu=0.01$, or may be obtained by using a cross-validation technique. For example, let 1 is a $(N_S+N_T)$-dimensional column vector with all ones and $I_m \in \mathbb{R}^{m \times m}$ is an m-dimensional identity matrix. The centering matrix H is determined as $$H = I_{N_S+N_T} - \frac{1}{N_S+N_T} 11^T.$$

The element of the frequency matrix L, i.e., $L_{ij}$, is equal to $1/N_S^2$ if the feature differences $x_i$ and $x_j$ are from source domain. If the feature differences $x_i$ and $x_j$ are from target domain, then the element $L_{ij}$ is equal to $1/N_T^2$. If the feature differences $x_i$ and $x_j$ are from source and target domain respectively, the element $L_{ij}$ is equal to $-1/N_S N_T$. In one example, the objective function is maximised by performing eigen-decomposition on the matrix $(KLK+\mu I)^{-1} KHK$ and the projection W is formed by selecting a number of leading eigenvectors obtained from the eigen-decomposition. The leading eigenvectors are the eigenvectors corresponding to largest eigenvalues. In another example, the projection W is determined by using an optimisation algorithm, e.g., iterative gradient descent algorithm, to maximise the objective function.

In another arrangement, the projection W is learned using label information from the source domain and considering three properties: (1) minimal distance between the distributions of feature differences from two different domains; (2) high dependence on the label information from source domain; (3) preserving the local geometry. Therefore, the projection W is determined by minimising the distance between the distributions of feature differences from two different domains, maximising the dependence between kernel matrix and labels of source domain data, and maintaining the neighbouring relationship underlying the input data. The projection W is determined by maximising the following objective function in accordance with Equation (3), as follows:

$$\max_W \mathrm{trace}\big((W^T K(L+\lambda M)KW + \mu I)^{-1} W^T KHK_y HKW\big) \quad (3)$$

where L represents a frequency matrix, $K_y$ represents a regularised kernel label matrix, M represents a graph Laplacian matrix, and $\lambda$ is a trade-off parameter, which is predefined, e.g., $\lambda=0.1$, or selected using a cross-validation technique. The regularised kernel label matrix $K_y$ is constructed using the binary labels of source domain data and can be written as $K_y = \gamma K_l + (1-\gamma)I$ where $K_l$ represents a kernel label matrix and y is a regularisation factor, which can be predefined, e.g., $\gamma=0.5$. The size of the kernel label matrix $K_l$ is equal to the size of the composite kernel matrix K. An element of the kernel label matrix $K_l(i,j)$ is equal to zero if both i and j are larger than the number of feature differences from the source domain, i.e., $N_S$. Otherwise, the element of the kernel label matrix $K_l(i,j)$ is determined by taking a kernel function of two label values from the source domain, e.g., $K_l(i,j)=k(y_i,y_j)$, where $y_l$ is the label for the feature difference $x_{S,i}$ from the source domain. The kernel function $k(\cdot)$ used in the kernel label matrix $K_l$ is the same as the kernel function used in the intra-domain and inter-domain kernel matrices. The graph Laplacian matrix M is constructed based on the k nearest neighbours of each feature difference that are determined by calculating distances between feature differences. The number of nearest neighbours k is predefined (e.g., k=3). The distance between feature differences may be Euclidean distance or cosine distance. In one example, the objective function is maximised by performing eigen-decomposition on the matrix $(K(L+\lambda M)K+\mu I)^{-1}KHK_yHK$ and the projection W is formed by selecting a number of leading eigenvectors obtained from the eigen-decomposition. In another example, the projection W is determined by using an optimisation algorithm, e.g., iterative gradient descent algorithm, to maximise the objective function.

The method 600 progresses under execution of the processor 205 from step 650 to a projecting step 660, where the learned projection W determined at step 650 is used to project all the feature differences from source domain to the latent subspace. The projection of all the feature differences from source domain is described in accordance with Equation (4), as follows:

$$X_S'=PW \qquad (4)$$

where P is a kernel matrix where each element is the kernel value between a feature difference from either source or target domain, i.e., $P_{ij}=k(x_{S,i}, x_j)$, where $x_{S,i}$ represents a feature difference from source domain and $x_j$ represents a feature difference from either source domain or target domain. The kernel function $k(x_{S,i}, x_j)$ is the same as the kernel function used in the intra-domain and inter-domain kernel matrices at step 640.

The method 600 progresses under execution of the processor 205 from the step 660 to a training step 670, where a similarity classifier is learned using the projected feature differences obtained at step 660 and the labels generated at step 630. The output of step 670 is a similarity classifier which is later used in the method 700 to determine a similarity score between the appearance descriptors of a pair of detected objects in the target domain by applying the similarity classifier to a projected difference of appearance descriptors of the objects.

In one arrangement, the similarity classifier is determined at step 670 using support vector machines (SVM). The kernel function for the SVM classifier is pre-selected. For example, the kernel function may be linear kernel or may be a Gaussian kernel. The regularisation parameter of the SVM classifier may be predefined (e.g., 5.0) or may be determined by using the cross-validation technique. The output of the SVM classifier is a binary label and the prediction probability for the label. When the SVM classifier is used in the method 700, the prediction probability is used as a similarity score between the appearance descriptors of a pair of detected objects in the target domain.

In another arrangement, a similarity classifier is determined from projected feature differences and binary labels from the source domain based on a Mahalanobis distance metric. The Mahalanobis distance metric $d_M(x_i)$ is described in accordance with Equation (5), as follows:

$$d_M(x_i)=x_i^T M x_i \qquad (5)$$

where M represents the parameter matrix to be learned, and $x_i$ denotes a feature difference from the source domain. The output of the similarity classifier is the Mahalanobis distance. When the similarity classifier is used in the method 700, the Mahalanobis distance is used as a similarity score between the appearance descriptors of a pair of detected objects in the target domain.

The method 600 concludes after completing the training step 660. The steps 610 to 660 effectively operate to determine a projection W and a trained similarity classifier based on appearance descriptors from both source and target domain training data and labels for the source domain training data.

Figure 7:
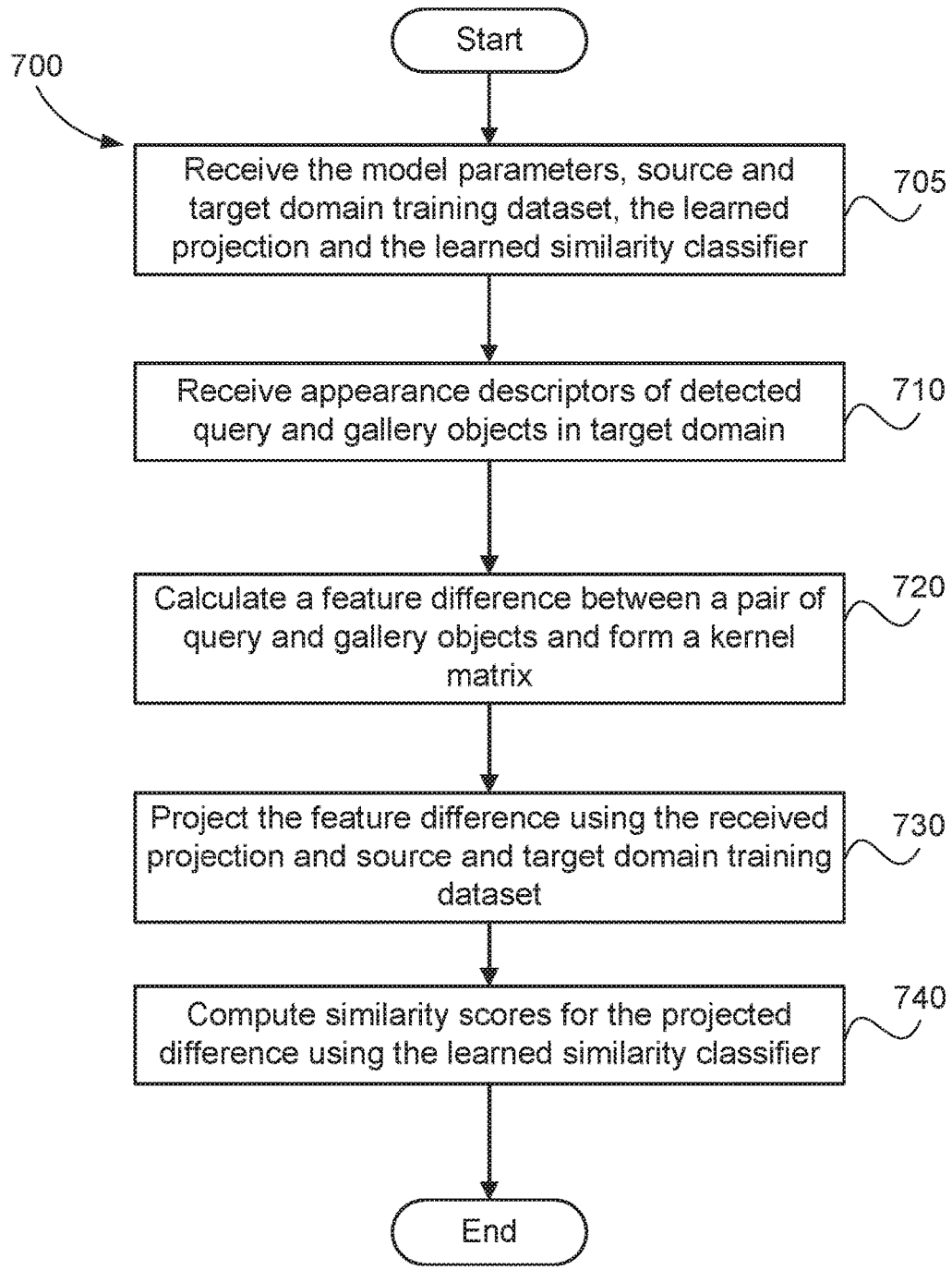
FIG. 7 is a schematic flow diagram of a method of determining similarity scores for a pair of query and gallery objects.

A method 700 of processing data to determine a similarity score for a pair of query and gallery objects, as executed at step 350 of the method 300 is now described with reference to FIG. 7. The method 700 may be implemented within the module 201 as one or more software code modules of the software application program 233 resident in the hard disk drive 210 and controlled by execution of the processor 205.

The method 700 starts at a receiving step 705, where the model parameters (e.g., the type of kernel function and parameter values of the kernel function), source and target domain training dataset used in the method 600, the learned projection determined at step 650, and the learned similarity classifier obtained at step 670 are received under execution of the processor 205. The data received at step 705 may be stored in the memory 206, under execution of the processor 205.

Next, appearance descriptors of the detected query and gallery objects in target domain are received at step 710. For the example application in FIG. 1, the detected object 132 in query image 120 is an example of a query object in target domain. Similarly, the detected objects 130, 134, and 136 in gallery image 110 are examples of gallery objects in target domain.

The method 700 progresses under execution of the processor 205 from the step 710 to the determining step 720. At step 720, a feature difference between a pair of query and gallery objects is determined from the target domain. Step 720 is implemented for normal operation in a similar manner to step 625 of the method 600 during training. Step 720 may be repeated for all combinations of query and gallery objects selected at steps 330 and 335 of method 300 respectively. The output of step 720 is a set of feature differences from target domain which may be stored in the memory 206 under execution of the processor 205.

The method 700 progresses under execution of the processor 205 from the step 720 to a projecting step 730. At step 730, feature differences determined at step 720 are projected to the latent subspace by using the learned projection W determined at step 650 of the method 600 and source and target domain training dataset received at step 705. Step 730 is implemented in a similar manner to step 660 of method 600. The output of step 730 is the projected feature differences for target domain which may be stored in the memory 206 under execution of the processor 205.

The method 700 progresses under execution of processor 205 from the step 730 to a computing step 740. At step 740, similarity scores from the projected feature differences are determined using the similarity classifier trained at step 660 of method 600. The similarity classifier produces a large similarity score for a pair of query and gallery objects that are visually similar. Likewise, the similarity classifier produces a small similarity score for a pair of query and gallery objects that are visually dissimilar.

The output of the method 700 is a set of similarity scores associated with each pair of query and gallery objects in target domain. The set of similarity scores determined at step 740 may be stored in the memory 206 under execution of the processor 205. The method 700 concludes after completing the step 740.

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

The invention claimed is:

1. A method to determine similarity of objects in images, the method comprising:
   determining feature vectors for objects in images captured by cameras operating in a training domain;
   determining feature vectors for objects in images captured by cameras operating in a target domain, wherein the cameras of the target domain operate with different environmental factors to the cameras of the training domain;
   determining a mapping for a difference in the feature vectors of the training domain and the target domain;
   applying the determined mapping to the feature vectors of the training domain and the target domain to convert the difference in the feature vectors of the training domain and the target domain to a matching space;
   determining a classifier using data associated with the feature vectors of the training domain in the matching space; and
   determining a similarity of the objects in the images captured in the target domain using a difference of feature vectors for the objects by applying the classifier to the feature vectors of the objects in the matching space.

2. The method according to claim 1, further comprising determining a function of the difference between the feature vectors of the training domain and the target domain.

3. The method according to claim 1, further comprising determining an absolute difference between the feature vectors of the training domain and the target domain.

4. The method according to claim 1, wherein the difference in the feature vectors of the training domain and the target domain is a Euclidean distance.

5. The method according to claim 1, wherein the difference in the feature vectors of the training domain and the target domain is a cosine distance.

6. The method according to claim 1, further comprising determining a label for each of the determined differences.

7. The method according to claim 1, wherein determining the mapping includes using a composite kernel matrix to determine a projection.

8. The method according to claim 1, further comprising minimising difference in the feature vectors of the training domain and the target domain.

9. The method according to claim 1, further comprising representing a distribution of the difference in the feature vectors of the training domain and the target domain by a mean value of difference.

10. The method according to claim 1, wherein determining the mapping includes using an optimisation algorithm.

11. The method according to claim 1, wherein determining the classifier includes using support vector machines.

12. The method according to claim 1, wherein determining the classifier is based on the difference in the feature vectors of the training domain.

13. The method according to claim 1, further comprising generating, based on a result of determining the similarity of the objects in the images captured in the target domain, a response to either notify a user or to tag a gallery object, wherein the different environmental factors include images captured by different cameras, captured at different times, and images that represent different scenes.

14. An apparatus to determine similarity of objects in images, the apparatus comprising:
   a determining unit configured to determine feature vectors for objects in images captured by cameras operating in a training domain;
   a determining unit configured to determine feature vectors for objects in images captured by cameras operating in a target domain, wherein the cameras of the target domain operate with different environmental factors to the cameras of the training domain;
   a determining unit configured to determine a mapping for a difference in the feature vectors of the training domain and the target domain;
   an applying unit configured to apply the determined mapping to the feature vectors of the training domain and the target domain to convert the difference in the feature vectors of the training domain and the target domain to a matching space;
   a determining unit configured to determine a classifier using data associated with the feature vectors of the training domain in the matching space; and
   a determining unit configured to determine a similarity of the objects in the images captured in the target domain using a difference of feature vectors for the objects by applying the classifier to the feature vectors of the objects in the matching space.

15. A non-transitory computer-readable medium storing a program to cause a computer to execute a method to determine similarity of objects in images, the method comprising:
   determining feature vectors for objects in images captured by cameras operating in a training domain;
   determining feature vectors for objects in images captured by cameras operating in a target domain, wherein the cameras of the target domain operate with different environmental factors to the cameras of the training domain;
   determining a mapping for a difference in the feature vectors of the training domain and the target domain;
   applying the determined mapping to the feature vectors of the training domain and the target domain to convert the difference in the feature vectors of the training domain and the target domain to a matching space;
   determining a classifier using data associated with the feature vectors of the training domain in the matching space; and
   determining a similarity of the objects in the images captured in the target domain using a difference of feature vectors for the objects by applying the classifier to the feature vectors of the objects in the matching space.

16. A system to determine similarity of objects in images, the system comprising:
   a memory for storing data and a computer program;
   a processor coupled to the memory for executing the computer program, the program having instructions for:
   determining feature vectors for objects in images captured by cameras operating in a training domain, determining feature vectors for objects in images captured by cameras operating in a target domain, wherein the cameras of the target domain operate with different environmental factors to the cameras of the training domain, determining a mapping for a difference in the feature vectors of the training domain and the target domain, applying the determined mapping to the feature vectors of the training domain and the target domain to convert the difference in the feature vectors of the training domain and the target domain to a matching space, determining a classifier using data associated with the feature vectors of the training domain in the matching space, and determining a similarity of the objects in the images captured in the target domain using a difference of feature vectors for the objects by applying the classifier to the feature vectors of the objects in the matching space.

* * * * *